United States Patent [19]

LaForest

[11] 3,715,669

[45] Feb. 6, 1973

[54] RECEIVER FOR A FREQUENCY MODULATED OVERLAY TRACK CIRCUIT

[75] Inventor: John P. LaForest, Conesus, N.Y.

[73] Assignee: General Signal Corporation, Rochester, N.Y.

[22] Filed: Aug. 13, 1970

[21] Appl. No.: 63,453

[52] U.S. Cl. .............325/320, 246/34 CT, 246/34 B, 340/258 C

[51] Int. Cl. .......B61l 21/10, G08b 13/22, H04b 1/16

[58] Field of Search.........246/34 R, 34 B, 34 CT, 40, 246/128–130; 325/30, 320, 344; 178/66; 340/49, 258 C, 38

[56] References Cited

UNITED STATES PATENTS 2,975,272 3/1961 Renick et al. ........................246/34 R
3,359,416 12/1967 Wilcox................................246/34 R
3,450,873 6/1969 Whitten...........................246/34 CT

*Primary Examiner*—Robert L. Griffin
*Assistant Examiner*—John C. Martin
*Attorney*—Harold S. Wynn and Milton E. Kleinman

[57] ABSTRACT

A receiver is provided for a frequency modulated overlay track circuit in which a frequency modulated signal having alternately occurring extreme side-band components is communicated along a railroad right of way. The system which is subject to the influence of the presence of a railroad vehicle comprises, a tuner means responsive to the F.M. signals separating one side-band component of the signal from the other and polarizing means for generating distinctive signals of opposite polarity in response to the respective side-band components. A relay is provided which is responsive to the distinctive signals occurring periodically and alternately for providing manifestation of a clear right of way.

18 Claims, 2 Drawing Figures

RECEIVER FOR A FREQUENCY MODULATED OVERLAY TRACK CIRCUIT

BACKGROUND OF INVENTION

This invention relates to track circuits and in particular a circuit receiver in a frequency modulated overlay track circuit.

In the railroad signaling art, frequency modulation of a track circuit signal has been found to be quite useful with respect to safety considerations required by the railroads. Frequency modulation exhibits better noise rejection characteristics than, for example, an amplitude modulated signal which may be effected by drift in the gain of the output signal. Additional stages are necessary to provide automatic gain control and the results area more complicated system which may be susceptible to more frequent malfunctions.

When using a frequency modulated signal, a code may be superimposed on the carrier as, for example, a rate code signal and the reception of a carrier can provide occupancy information. By requiring the reception of a carrier plus a proper rate signal, a rather secure system can be devised with substantially less complex circuitry then with an amplitude modulated system. The presence of a code provided by modulation of the carrier introduces a dynamic shift to the system which may be used for checking purposes, and providing a fail-safe aspect to the system as a whole.

Systems exist which are capable of detecting the presence of a frequency modulated signal and the reception of at least one side-band or shift frequency is sufficient to trigger a succeeding stage. For purposes of safety, however, it is desirable to detect both side-bands independently and require the reception thereof before a succeeding stage may be triggered, thereby providing additional safety to the system because of the tight restrictions on the characteristics of the wave form.

It is therefore an object of the present invention to provide a system which substantially obviates one or more of the limitations and disadvantages of the described prior arrangements.

It is another object of the present invention to provide an improved receiver for a frequency modulated overlay track circuit.

SUMMARY OF INVENTION

There has been provided a receiver for a frequency modulated overlay track circuit which communicates a frequency modulated signal having alternately occurring extreme side-band components along a right of way of a railroad subject to the influence of the presence of a vehicle. The system comprises a tuner means responsive to F.M. signals for separating one side-band component of the signal from the other and polarizing means responsive to the respective side-band component for generating signals of opposite polarity alternately. Pulse driver means responsive to the polarized signals provides alternating output pulses indicative of a clear right of way when the outputs are of opposite polarity and occur periodically in substantially a 180° phase relationship one to the other.

For a better understanding of the present invention, together with other and further objects thereof, reference is had to the following description taken in connection with the accompanying drawings, while its scope will be pointed out in the appended claims.

DESCRIPTION OF THE PREFERRED EMBODIMENT

Figure 1:
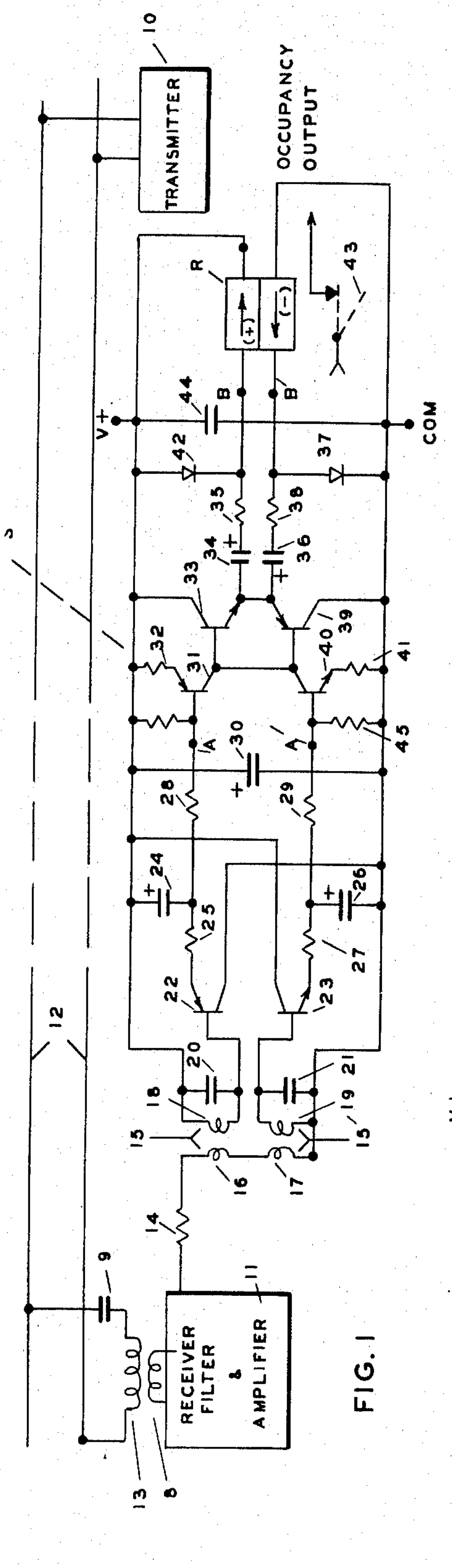
FIG. 1 is a schematic diagram of circuit receiver of the present invention.

The system of the present invention is used to determine, among other things, the presence of a railroad vehicle within a section of track defined by the position of a transmitter 10 and a receiving unit 11. At some point beyond the transmitter, along the right of way of the rails, a shunt S, indicated by the dotted line, is provided when a railroad vehicle is present between the transmitter 10 and receiver 11. The shunt S blocks signals from the transmitter 10 to the receiver and prevents energization of the remainder of the circuitry coupled to the receiver 11, which ultimately causes the deenergization of the output relay R.

The transmitter 10 generates a frequency modulated carrier signal, which in effect is a signal having a frequency of F+ or F−. The F+ and F− indicates that the signal transmitted has a frequency alternating about a carrier $F_C$ by some incremental frequency (+) or (−) the carrier $F_C$. The receiver 11 is coupled to the rails 12 by a directly connected series resonant circuit including coil 13 and capacitor 9, and a coupling coil 8. The receiver 11 filters and amplifies the signal for transmission to the next stage of the system.

The modulated signal $F_M$, which is the carrier $F_C$ modulated by F+ and F−, is transmitted through a current limiting resistor 14 from the receiver 11 to the primaries of transformers 15—15′ which include coils 16 and 17 respectively. The secondaries of the transformers 15—15′ include coils 18 and 19 and tuning capacitors 20 and 21, which tune the secondaries of the transformers 15—15′ to F− and F+ respectively. Two transformers are chosen in order to assure isolation of one channel from the other. The F+ and F− occur periodically and each time the F− signal occurs, transistor 22 conducts through its emitter-collector circuit to ground or common. Similarly, as an F+ signal occurs, the transistor 23 conducts from the supply voltage of V+ through its emitter-collector circuit.

The alternating current component of the signals to transistors 22 and 23 is shunted out by the action of capacitor 24, resistor 25 and capacitor 26, resistor 27 respectively which represents a low impedance to the carrier frequency signal. The resistors 28 and 29 in the emitter circuits of transistors 22 and 23 respectively are for limiting the current drawn from the remainder of the circuit. Capacitor 30 is included for eliminating as nearly as possible any ripple in the remaining D.C. signals.

When transistor 22 conducts, the current drawn causes transistor 31 to conduct from V+ through biasing resistor 32 through its emitter-collector circuit drawing current thereby on the base of transistor 33 and causing it to conduct. Charge stored on capacitor 34 is then immediately discharged through resistor 35 and the upper coil of relay R V+ causing the relay R to be energized. The charge stored on the capacitor 34 must be more positive than the supply voltage V+ in order to pick the relay R through the upper coil. The arrow on the relay R indicates that it is a magnetically biased relay which will only pick if the current is of the proper polarity.

During the conduction of the transistor 33, capacitor 36 is charged through a path from the common terminal through diode 37 and resistor 38. The transistor 39 is non-conducting at this time and the transistor 33 is forward biased for completing the circuit for charging capacitor 36. From this it can be seen as one capacitor charges the other discharges.

Returning to the input to the system, when the F− signal ceases, the transistor 22 is cut off and the tuned circuit of coil 19 and capacitor 21 becomes responsive to the F+ signal if it is present from the output of receiver 11. The signal is then transferred to the base of transistor 23 which conducts and provides base current to transistor 40 which conducts through its collector-emitter circuit through resistor 41 to common. Conduction of the transistor 40 draws base current from transistor 39 and causes it to conduct. Similarly, since the transistor 22 has been shut-down, transistor 33 is cut off and the previously discharged capacitor 34 may be recharged from V+ through diode 42 and resistor 35. The charged capacitor 36 may discharge through the emitter-collector circuit of the transistor 39 drawing current through the lower coil of the relay R. The charge on the capacitor 36 in order to accomplish this must be more negative with respect to the common potential. This current drawn through the lower coil of relay R then maintains the energized condition of the relay and maintains the front contact 43 closed thus indicating an empty section of track. The capacitor 44 is coupled across the terminals from common to V+ for suppressing any transients which may appear due to the switching of the transistors.

Figure 2:
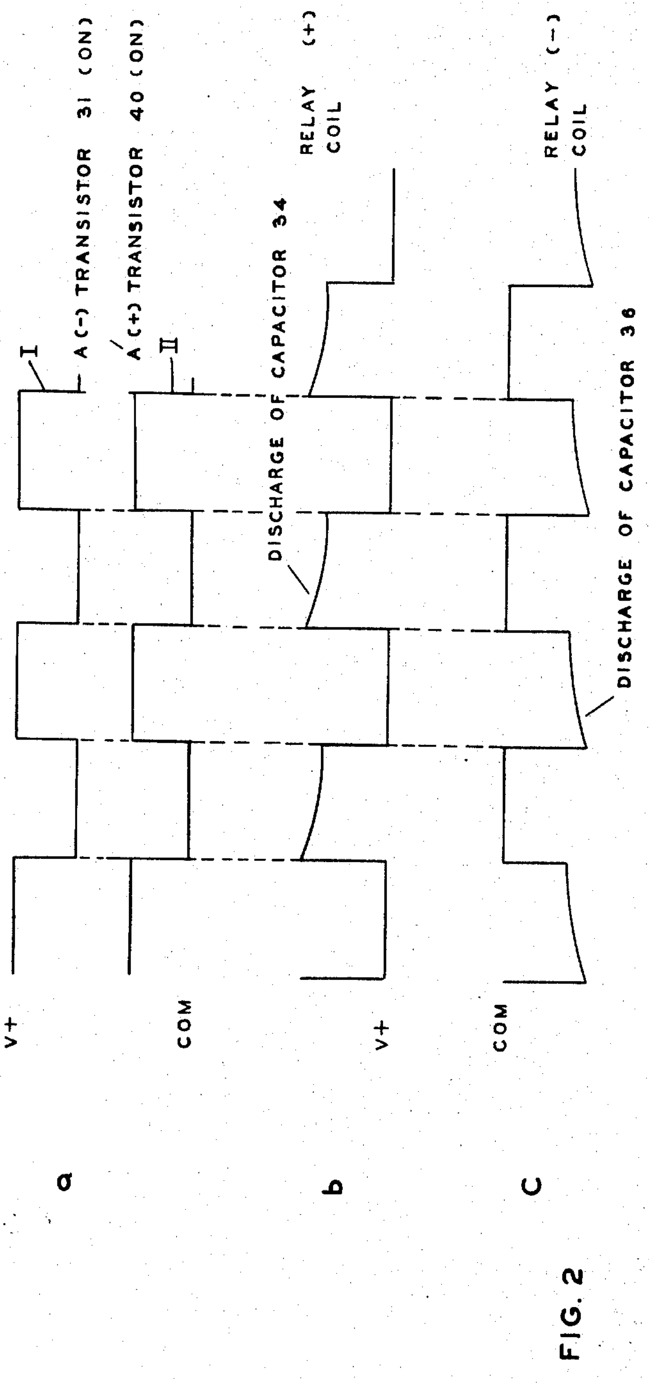
FIG. 2 shows various wave form configurations in order to assist in the description of the present invention.

FIG. 2 shows the wave forms which occur at various critical points in a circuit. FIG. *2a* shows the wave form of points A and A′ relative to common. The waves are identical except that the signals occur at different D.C. potentials. The transistors 31 and 40 are triggered by negative and positive potentials of the wave forms I and II respectively. For example, when the wave form I, shown in FIG. *2a* goes negative, transistor 31 becomes conductive at the same time the wave form II is also negative at point A′ and therefore drives the transistor 40 to a non-conducting state. As the wave form I changes and goes positive, wave form II also goes positive and turns the transistors 40 and 31 on and off respectively.

The signal that maintains energy on the relay R is shown in FIGS. 2B and 2C. When the signal shown in FIG. *2b* goes positive, transistor 33 has been switched on and the capacitor begins to discharge through resistor 35 and the upper relay coil R. When the transistor 33 is shut off by the action of transistor 31 and transistor 22 being cut off due to the absence of the F− signal, the output of the capacitor 34 ceases. At this time, however, the transistor 39 begins to conduct if the F+ signal is impressed at the base of transistor 23 which ultimately causes the conduction of the transistor 39 and discharge of capacitor 36 which is shown by the legend in FIG. 2C. During the discharge period of the capacitor 36, capacitor 34 is being charged as previously described through the diode 43 and resistor 35. When again the transistor 33 is in a conductance state, the capacitor 34 having been charged over the previous off time of the transistor 33 discharges again through the upper relay coil R.

If, for any reason one of the side-bands of the carrier F is missing, the relay R will deenergize because the entire drive stops. If one of the side-bands, for example F− is not received, transistor 22 is non-conducting and transistors 31 and 33 remain off. Once capacitor 36 discharges through transistor 39 for maintaining energy in the lower coil of relay R, the system should, under the influence of an F− signal, turn on transistors 22, 31 and 33 for discharging capacitor 34 and charging capacitor 36. If, however, no F− signal occurs, the system does not discharge the capacitor 34. If a F+ signal is now received, transistors 23, 40 and 39 are turned on, but no energy for maintaining relay R is present on capacitor 36 because the transistor 33 was not switched on during the previous cycle for charging capacitor 36. It is, therefore, essential that both channels F+ and F− are received because the reception of one side-band provides energy for switching the circuitry for the other side-band. When the signal at A′ goes positive, transistor 40 conducts, and since no negative signal is present at A, transistor 31 is cut off. When the signal at A goes negative, transistor 31 turns on and 40 cuts off, if no positive signal is present at A′. It can be seen that the transistors 22, 31 and 33 are of the opposite type to their associated transistors 23, 40 and 39. The complementary sets of transistors assures that there is also less likelihood that the relay R will be picked by spurious signals which may be introduced by noise or other factors.

In this connection, it can be observed that component failure also prevents picking up of relay R. If transistor 33 becomes short-circuited, for example, then when transistor 39 is switched on, a virtual dead short across the supply exists and the transistors 33 and 39 will burn out from the short circuit current. In addition, if one of the transistors remains open-circuited, the system will cease to operate and relay R will drop away because at least one channel will be lost and such a condition as previously described is not tolerated in the design of this system.

The relay R is coupled to the output of the circuit in such a way as to assure a fail-safe condition. The relay R is a magnetically biased polar relay which must be energized by a current through one or both of its coils with a polarity as indicated in the drawing. The connection of the coils of relay R from the output of the circuit to the supply V+ and common terminals respectively is opposed to the normal direction of current for energizing the relay. In order to pick the relay, a current must flow from B through the upper coil of relay R to V+ or from common through the lower coil to B′. In order for such a current to flow, the potential for B must be higher than V+ and likewise the potential at B′ must be more negative then common. As previously noted, the charge stored on capacitors 34 and 36 provide the energy for picking relay R through the upper and lower coils respectively. The wave shapes of the signals which provide for the energization of the relay R are shown in FIG. *2b* and *2c*. The signal shown in FIG. *2b* is that which appears at point B rising from the supply level V+ to a more positive voltage for picking relay R through the upper coil. Similarly, the wave shape shown in FIG. 2*c* is that which appears at B' decreasing from the common potential negative for picking relay R through the lower coil. The wave forms of FIGS. 2*b* and 2*c* illustrate the phase relation of 180° between the signals at B and B' and also the polarity difference.

A prime consideration in connecting the relay R to the output in this manner was to assure a safe failure. If a short occurs across the B—B' terminals, the voltage from the supply V+ through the coils of the relay R to common opposes the pick up current direction and the relay R will not energize. In order to achieve this safety feature, the outputs of the system at B—B' must therefore be of voltage levels sufficient to overcome the reverse bias of the supply V+ and common.

A further inclusion in the circuit for providing safety to the system and additional noise rejection is the provision of limiting resistors 28 and 29. If transistor 31 is in a conductance state, a positive pulse at the base of transistor 40 is not likely to turn it on. The magnitude of pulses likely to occur at the base of transistor 40 is limited by the presence of resistor 29, in addition, if transistor 31 is on, the collector of transistor 40 is almost at the level of the supply potential; that is, V+ less the drop across resistor 32 and forward resistance of transistor 31 in parallel with resistor 46. This condition reverse-biases transistor 39 and further reduces the possibility of an inadvertent activation of the transistor 40. A similar situation exists for transistor 31 when transistor 40 is in a conductance state. In fact, one transistor must turn off before the other can turn on, thus assuring that only one output occurs at a time. As previously mentioned, a simultaneous energization of a similar transistor in both circuits results in a short circuit assuring a safe failure.

While there has been described what is at present considered to be the preferred embodiment of the present invention, it will be obvious to those skilled in the art that various changes and modifications may be made therein without departing from the invention, and it is therefore aimed in the appended claims to cover all such changes and modifications that fall within the true spirit and scope of the invention.

What is claimed is:

1. A receiver in a frequency modulated overlay track circuit for communicating a frequency modulated signal having alternately occuring first and second frequency components, along a right of way subject to the influence of the presence of a vehicle comprising:

a. tuner means responsive to said F.M. signals for producing a first output signal which includes only said first frequency components and a second output signal which includes only said second frequency components;

b. polarizing means responsive to said first and second output signals for providing third and fourth output signals of opposite polarity respectively; and c. means responsive to said third and fourth output signals for generating a continuous signal to manifest a clear right of way provided that said output signals for the respective components occur periodically in substantially a 180 phase relation one to the other.

2. The receiver of claim 1 wherein said polarizing means comprises: a solid state unidirectional device coupled to each tuned circuit responsive to only one of said frequency components and conducting only upon the reception of a corresponding side-band signal.

3. The receiver of claim 2 wherein said solid state unidirectional device comprises: one transistor each of opposite conductive types, conducting only upon occurrence of a correct current polarity input.

4. The receiver of claim 2 further including: filtering means coupled to the outputs of the unidirectional devices responsive respectively to the associated frequency component for filtering out alternating current components of said outputs.

5. The receiver of claim 2 wherein said polarizing means further comprises: first solid state switching means coupled to the output of each of said unidirectional devices for conducting in response to the conductance state of its associated device.

6. The receiver of claim 5 wherein said first switching means comprises: a transistor of similar conductance type to its associated unidirectional device having its base coupled to the output of said device and conducting in accordance therewith.

7. The receiver of claim 6 wherein second solid state switching means is provided for each first switching means responsive to the outputs thereof and conducting in accordance therewith; and storage means associated with each second switching means for storing energy each time said associated second switching means is non-conducting and discharging each time the other second switching means is conductive.

8. The receiver of claim 7 wherein each one of said charging means receives storage energy each time its associated second switching means is closed and the other second switching means is open.

9. The receiver of claim 7 wherein said second switching means comprises: a transistor for each associated first switching means of opposite conductance type than its associated first switching means.

10. The receiver of claim 7 wherein said charging means comprises: a tank circuit coupled to the output of each of said second switching means including a resistor and capacitor; and a diode for each tank circuit coupled for permitting charging of each of said tank circuits only when the associated second switching means is in a non-conductance state.

11. The receiver of claim 1 wherein an output relay means is provided having two inputs governed by outputs of the polarizing means either one of which when energized is capable of actuating said relay.

12. The receiver of claim 11 wherein said output relay is a magnetically biased polar relay having one input thereof only responsive to outputs of the polarizing means of one polarity and the other input responsive to outputs of the polarizing means of opposite polarity, said relay being actuated for closing its front contact only when said outputs occur periodically in a 180° phase relation one to the other.

13. The receiver of claim 12 wherein said relay is coupled between a supply source and the output of said polarizing means in opposite polarity to normal energizing current, and said outputs of the polarizing means having a potential relatively greater than the supply source for energizing the relay upon the occurrence of said periodic outputs of the polarizing means.

14. A receiver for a continuous frequency modulated signal having periodically alternate first and second side-band frequency components, the receiver having a tuner which provides said first side-band component at one output and said second side-band component at another output wherein the improvement comprises:

a. polarizing means responsive to the respective tuner outputs for generating output signals of opposite polarity respectively, and b. decoding means responsive to the signals of opposite polarity for delivering a continuous output signal only provided that the outputs of the polarizing means occur periodically and alternately.

15. A receiver according to claim 14 wherein the polarizing means comprises a capacitor and means for charging the capacitor in response to one of the tuner outputs and discharging the capacitor in response to the other of the tuner outputs.

16. A receiver according to claim 15 wherein the polarizing means comprises a second capacitor and means for charging the second capacitor in response to said another tuner output and discharging the second capacitor in response to said one tuner output.

17. A receiver according to claim 16 wherein the decoding means is governed by the discharge of the first and second capacitors to deliver an output only provided the capacitors are discharged periodically and alternately.

18. A receiver according to claim 17 wherein the decoding means includes a relay having one winding energized solely by discharge of the first capacitor and another winding energized solely by discharge of the second capacitor, whereby the relay is continuously in an actuated condition to manifest integrity of reception only provided that first and second capacitors are alternately charged and discharged periodically.

* * * * *